(12) United States Patent
Zaag et al.

(10) Patent No.: US 7,723,955 B2
(45) Date of Patent: May 25, 2010

(54) METHOD AND SYSTEM FOR MONITORING AND BALANCING CELLS IN BATTERY PACKS UTILIZING OPTICALLY COUPLED CELL VOLTAGE SELECTION SIGNAL, CELL VOLTAGE ISOLATION AMPLIFIER, AND ZENER DIODES IN BALANCING CIRCUIT

(75) Inventors: Nader Zaag, Mississauga (CA); Akos Toth, Etobicoke (CA)

(73) Assignee: A123 Systems, Inc., Watertown, MA (US)

( * ) Notice: Subject to any disclaimer, the term of this patent is extended or adjusted under 35 U.S.C. 154(b) by 300 days.

(21) Appl. No.: 11/780,296

(22) Filed: Jul. 19, 2007

(65) Prior Publication Data

US 2008/0018300 A1 Jan. 24, 2008

Related U.S. Application Data

(60) Provisional application No. 60/807,821, filed on Jul. 19, 2006.

(51) Int. Cl.
*H02J 7/00* (2006.01)

(52) U.S. Cl. .................... 320/118; 320/109; 320/132; 320/150; 320/151; 320/152; 320/153

(58) Field of Classification Search ............... 320/118, 320/119, 132
See application file for complete search history.

(56) References Cited

U.S. PATENT DOCUMENTS

| | | | |
|---|---|---|---|
| 4,484,130 A * | 11/1984 | Lowndes et al. | 320/116 |
| 4,564,798 A | 1/1986 | Young | |
| 4,771,449 A * | 9/1988 | Kiko et al. | 379/93.05 |
| 5,710,503 A * | 1/1998 | Sideris et al. | 324/431 |
| 5,814,970 A | 9/1998 | Schmidt | |
| 6,806,686 B1 * | 10/2004 | Thrap | 320/118 |
| 2001/0019256 A1 * | 9/2001 | Olsson et al. | 320/118 |

OTHER PUBLICATIONS

International Search Report, International Patent Application No. PCT/US07/16356, mailed Mar. 28, 2008 (3 Pages).

* cited by examiner

*Primary Examiner*—Edward Tso
*Assistant Examiner*—Manuel Hernandez
(74) *Attorney, Agent, or Firm*—Wilmer Cutler Pickering Hale and Dorr LLP

(57) ABSTRACT

A system for balancing energy delivery devices within the one or more battery packs and for providing isolated monitoring of the battery packs includes at least one group of energy delivery devices electrically connected in series. For each group of energy delivery devices, the system includes a balancing circuit for each adjacent pair of energy delivery devices. The balancing circuit adjusts charge stored in each energy delivery device of the pair so that the charge stored in the energy delivery devices of the pair is substantially equal, and the charge stored in each energy delivery device remains above a threshold. The system also includes a voltage monitoring module for sequentially selecting each of the energy delivery devices and providing a voltage associated with the selected device at an output port. The voltage monitoring module uses a low on-resistance differential multiplexer to select each of the energy delivery devices.

20 Claims, 8 Drawing Sheets

METHOD AND SYSTEM FOR MONITORING AND BALANCING CELLS IN BATTERY PACKS UTILIZING OPTICALLY COUPLED CELL VOLTAGE SELECTION SIGNAL, CELL VOLTAGE ISOLATION AMPLIFIER, AND ZENER DIODES IN BALANCING CIRCUIT

CROSS REFERENCE TO RELATED APPLICATIONS

This application claims benefit of the following patent application: U.S. Provisional Patent Application Ser. No. 60/807,821, filed Jul. 19, 2006.

BACKGROUND OF THE INVENTION

The present invention relates to methods and systems for operating battery packs, and more particularly, to operating battery packs that are deep cycled in electric vehicle applications, in a manner that enhances performance, longevity and safety.

The way that a battery pack is operated in the field can significantly affect its performance, longevity and safety. This concern is particularly relevant for demanding applications, such as use in electric vehicles.

By way of example, consider a battery pack that is formed from a number of lithium cells connected together in series. The lifetime of the lithium battery pack degrades dramatically if the voltage across one of its cells falls below a predetermined threshold during discharge (typically three volts), or rises above a predetermined threshold during charging (typically 4.2 volts). For this reason it is very important that cell voltages be carefully monitored and measures be taken to maintain cell voltages in a particular range.

To complicate matters further, manufacturing defects in lithium cells result in some cells that do not hold as much charge as other seemingly identical cells. For this reason, when a number of lithium cells are connected together in series, defective cells discharge quicker than the other cells and thus are the first to hit the lower threshold described above during discharge. Such defective cells are often also the first to hit the upper threshold during charging. This imbalance between cells limits the effective range of operation of the battery pack, unless the charge is rebalanced during operation of the battery pack.

SUMMARY OF THE INVENTION

The present invention is directed to a method and system for monitoring the voltages of cells of one or more battery packs, and for balancing the cells within the packs. Such functionality may be provided conveniently in a single monitoring and balancing system that is adapted to interface with an existing external control system, while isolating the external control system from the battery cells being monitored and balanced. Monitoring and balancing with a single instrumentation component, for example a printed circuit board, reduces the number of interconnections required within the electrical system.

According to one aspect of the invention, there is provided a way to monitor and balance a battery pack formed from the series connection of cells, for example lithium cells, through a main system controller that available analog inputs and digital inputs. In one embodiment, such a controller includes a main system controller already being utilized in an electrical vehicle.

In general, a battery pack with $2^n$ cells can be monitored on a single analog input by using n digital control signals. This may be accomplished by channeling each of the $2^n$ cell voltages through a multiplexer that is controlled by the n digital inputs. Similarly, additional battery packs can be monitored with the addition of a free analog input on the system controller for each additional battery pack.

In one embodiment, signals representing the temperature of individual cells are also provided to the system controller. In an exemplary embodiment, thermisters are used to generate the temperature-dependent signals, although other temperature to electrical transducers known in the art may also be used. Temperature signals from multiple cells may be conveyed over a single analog input on the vehicle controller, for example through time division multiplexing.

In the described embodiments, no direct, non-isolated connection is required between the vehicle main system controller and the battery packs.

According to one exemplary embodiment, there is provided a battery cell balancing and isolated monitoring system for battery packs formed from blocks of a plurality of multiples of cells strung together in series. Each channel on the monitoring side of the system monitors, for example, eight cell blocks and is composed of a low on resistance differential multiplexer operating on split supply, a resistor divider, an isolation amplifier, an isolated DC to DC converter, and an output op-amp for impedance matching. Each balancing block performs balancing for two series connected cell blocks, allowing current shuffling of up to 500 mA, and has two Zener diodes, an opamp, two transistors, and four resistors.

In some embodiments, the monitoring system is isolated from the battery pack so that the cell voltages can be safely sent to an external control unit without connecting the control unit to battery ground. Such isolation may be accomplished, for example, with optical isolators, photo transistors, or current-based isolation amplifiers for improved accuracy and linearity, or combinations thereof.

In some embodiments, the cell balancing circuit is configured to resist discharge of cells proximate to a disconnected cell and generally provides protection from over charge and discharge.

In some embodiments, the monitoring system includes a low on-resistance differential multiplexer as an accurate means to monitor voltages and to allow quick transitions in monitoring from cell to cell, for quick identification of a shorted or disconnected cell.

In some embodiments, the system includes thermister inputs so that critical temperatures can be monitored.

In some embodiments, the system also includes onboard timer circuitry to generate selection signals for the differential multiplexers used for cell voltage monitoring as well as the multiplexers used for temperature monitoring.

In one aspect, the system is a system for balancing energy delivery devices within the one or more battery packs. The system includes at least one group of N energy delivery devices electrically connected in series, where N is an integer greater than one. For each group of N energy delivery devices, the system includes a balancing circuit for each adjacent pair of energy delivery devices. The balancing circuit adjusts charge stored in each energy delivery device of the adjacent pair so that (i) the charge stored in a first energy delivery device of the pair is substantially equal to a second energy delivery device of the pair, and (ii) the charge stored in each energy delivery device remains above a predetermined threshold.

In one embodiment, the balancing circuit includes at least one Zener diode for maintaining the charge stored in each energy delivery device above a predetermined threshold. Other embodiments may use alternative components known in the art for providing the voltage reference characteristics and associated characteristics of the Zener diode. In another embodiment, the balancing circuit includes a pair of Zener diodes, arranged in a back-to-back configuration, for maintaining the charge stored in each energy delivery device.

Another embodiment further includes voltage monitoring module for sequentially selecting each of the energy delivery devices and providing a voltage associated with the selected energy delivery device at an output port. The voltage monitoring module uses a low on-resistance differential multiplexer to select each of the energy delivery devices and provide the associated voltage.

In another embodiment, the differential multiplexer is powered by a split supply circuit. In yet another embodiment, the voltage monitoring module provides isolation between the energy delivery devices and the output port. In still another embodiment, the isolation includes passing select signals for the multiplexer through optical isolators, and passing the voltage associated with the selected energy delivery device through an isolation amplifier.

One embodiment further includes a temperature monitoring module for receiving a signal representative of a temperature associated with the battery pack and one or more other battery packs, and for selectively providing one of the received signals at an output port.

In another embodiment, the balancing circuits and the voltage monitoring module are combined in a single printed circuit board. In still another embodiment, each energy delivery device is a lithium cell.

In another aspect, a system for providing isolated monitoring of one or more battery packs, and for balancing energy delivery devices within the one or more battery packs includes at least one group of N energy delivery devices electrically connected in series, where N is an integer greater than one. For each group of N energy delivery devices, the system includes a balancing module and a voltage monitoring module. The balancing module includes a balancing circuit for each adjacent pair of energy delivery devices. The balancing circuit adjusts charge stored in each energy delivery device of the adjacent pair so that (i) the charge stored in a first energy delivery device of the pair is substantially equal to a second energy delivery device of the pair, and (ii) the charge stored in each energy delivery device remains above a predetermined threshold. The voltage monitoring module includes a differential multiplexer, operating on split supply, for sequentially selecting each of the energy delivery devices presented to a plurality of input ports and providing a voltage associated with the selected energy delivery device at an output port, wherein the differential multiplexer is characterized by a low on-resistance path from the input ports to the output port. The voltage monitoring module also includes a resistor divider for scaling the voltage associated with the selected energy delivery device to produce a scaled voltage. The voltage monitoring module further includes an isolation amplifier for providing an isolated version of the scaled voltage, an isolated DC to DC converter for supplying power to an input side of the isolation amplifier, and an output operational amplifier for impedance matching the scaled voltage to a system controller.

In one embodiment, the balancing circuit includes a pair of Zener diodes, arranged in a back-to-back configuration, for maintaining the charge stored in each energy delivery device.

One embodiment further includes an operational amplifier for determining a level of charge imbalance between the adjacent pair of energy delivery devices and producing an error signal corresponding the level of charge imbalance, and a stacked transistor pair arranged to redistribute the charge of the adjacent pair of energy delivery devices according to the error signal. In another embodiment, the differential multiplexer is powered by a split supply circuit.

Another embodiment further includes a temperature monitoring module for receiving a signal representative of a temperature associated with the battery pack and one or more other battery modules, and for selectively providing one of the received signals at an output port. In yet another embodiment, each energy delivery device is a lithium cell.

Another aspect includes a method of balancing energy delivery devices within a battery pack, wherein the battery pack includes a group of N energy delivery devices electrically connected in series, N being an integer greater than one. The method includes, for each adjacent pair of energy delivery devices within the battery pack, adjusting charge stored in each energy delivery device of the adjacent pair so that the charge stored in the energy delivery devices of the pair is substantially equal. The method further includes maintaining the charge stored in each energy delivery device above a predetermined threshold.

Another embodiment further includes redistributing charge between the adjacent pair of energy delivery devices with a redistribution circuit. The redistribution circuit includes a pair of Zener diodes, arranged in a back-to-back configuration, for maintaining the charge stored in each energy delivery device above a predetermined threshold.

One embodiment further includes sequentially selecting each of the energy delivery devices with a low on-resistance differential multiplexer, and providing a voltage associated with the selected energy delivery device. Another embodiment further includes supplying power to the differential multiplexer from a split supply circuit.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Embodiments of the present invention are adapted to provide battery cell monitoring, battery cell balancing or temperature monitoring, or combinations thereof. The described embodiments perform signal conditioning required so that safety-critical system voltages and temperatures can safely be sent to an external isolated vehicle controller, which can then make safety critical decisions based on the information received.

Figure 1:
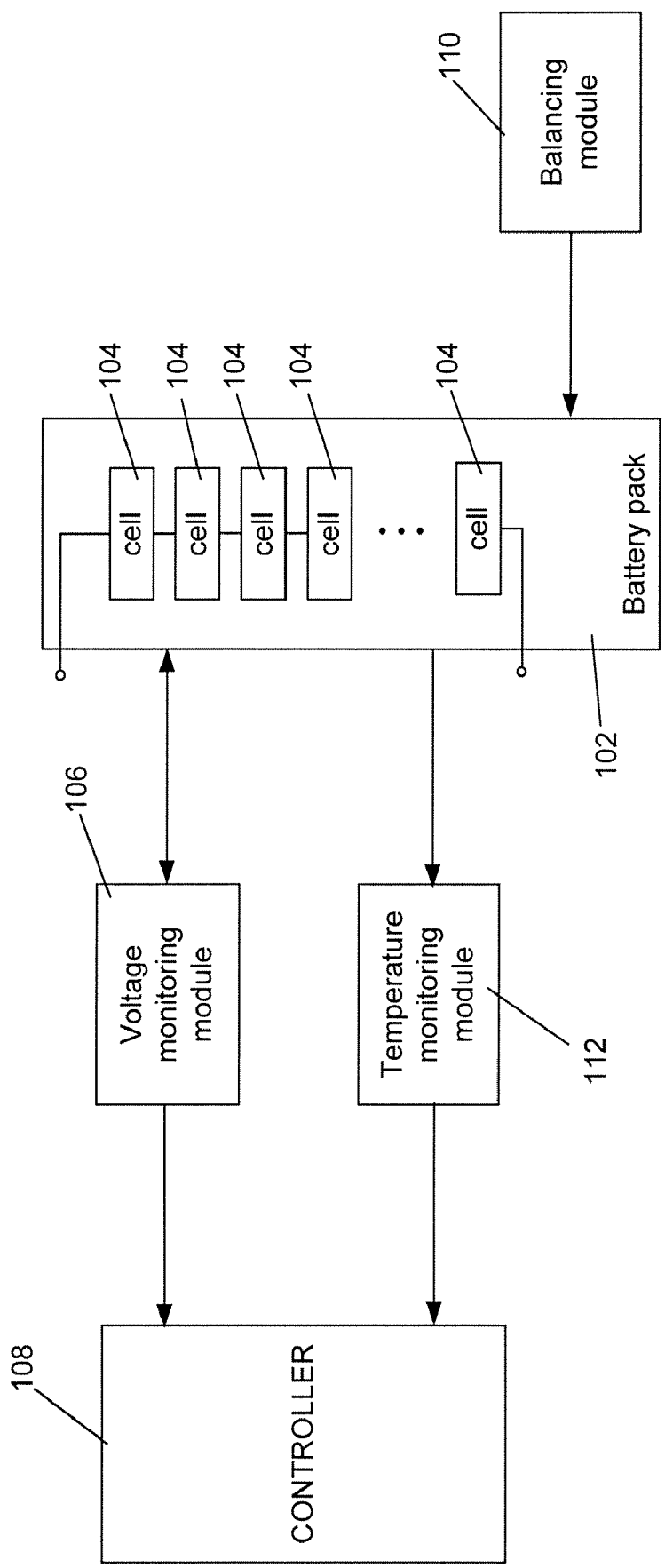
FIG. 1 shows a block diagram illustrating the general functionality provided by one or more of the described embodiments.

FIG. 1 is a block diagram illustrating the general functionality provided by one or more of the described embodiments of a system and method for monitoring and balancing battery packs. A battery pack 102 includes a two or more series connected energy delivery devices 104 (e.g., lithium cells).

A voltage monitoring module 106 receives voltage information associated with each of the energy delivery devices 104, conditions and isolates the voltage information and provides the voltage information via an output port to a system controller 108. The system controller 108 evaluates each of the energy delivery devices 104 during charging and discharging to determine if any individual energy delivery device 104 is in a potentially damaging state. For example, during charging, an individual cell may reach or exceed a safe voltage level even though the overall pack voltage is still below a safe level. Similarly, during discharge the voltage of an individual cell may drop below a minimum safety threshold even though the voltage of the overall battery pack is still above its minimum safety threshold. The system controller 108 discontinues charging or discharging the battery pack 102 when the system controller 108 detects an individual cell voltage at an undesired value.

A balancing module 110 evaluates the relative voltage levels of adjacent cells pairs and redistributes charge between the adjacent cells to mitigate differences in the cell voltages of the pair. As will be described in more detail below, the balancing module 110 includes functionality for preventing excessive cell discharge of one cell in the event the other of the cell pair is removed or otherwise disconnected.

A temperature monitoring module 112 receives information corresponding to the temperature of the battery pack 102. The temperature information is generally in the form of an electrical signal produced by a transducer located within the battery pack, although the temperature information may take other forms known in the art. The temperature monitoring module 112 provides the temperature information to the system controller 108. The temperature monitoring module may also receive temperature information from other battery packs (not shown) and provide the temperature information from multiple battery packs to the system controller 108.

The following sections describe the components shown in FIG. 1.

I. Cell Voltage Monitoring

Figure 2:
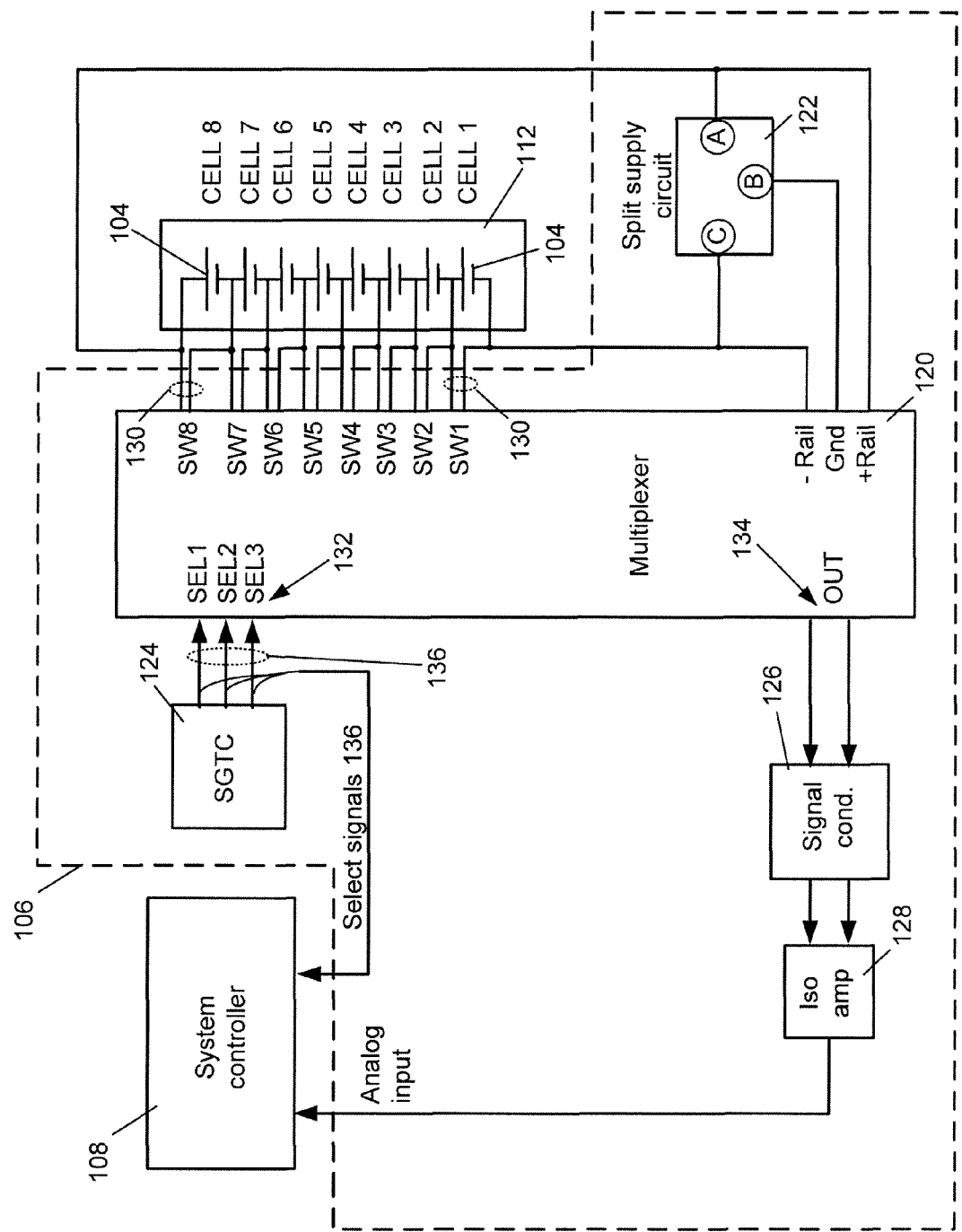
FIG. 2 shows one embodiment of the voltage monitoring module of FIG. 1.

FIG. 2 shows one embodiment of the voltage monitoring module 106, which measures the cell voltages of an eight cell battery pack 102. This is an exemplary embodiment only, and it should be understood that the concepts describe herein may be used for other sized battery packs.

The voltage monitoring module 106 includes an eight channel differential multiplexer 120, a split supply circuit 122, select generating timer circuitry 124, signal conditioning circuitry 126 and an isolation amplifier 128.

The differential multiplexer 120 receives eight signal pairs 130, each representing the voltage across one of the eight cells 104 in the battery pack 102. For clarity, only two of the signal pairs 130 and cells 104 are designated with reference numbers in FIG. 2. The differential multiplexer 120 provides a reliably low on-resistance from input to output, which increases the accuracy of the cell voltage measurement, as well as reducing the need for calibration due to variations in the device fabrication process. The increased accuracy provided by using a low on-resistance multiplexer allows for quick isolation of shorted or disconnected cells as compared to prior art systems. In the described embodiment, the differential multiplexer 120 is a DG 407 CMOS analog multiplexer device, which is manufactured by a number of companies, for example Intersil of Milpitas, Calif.

Figure 3:
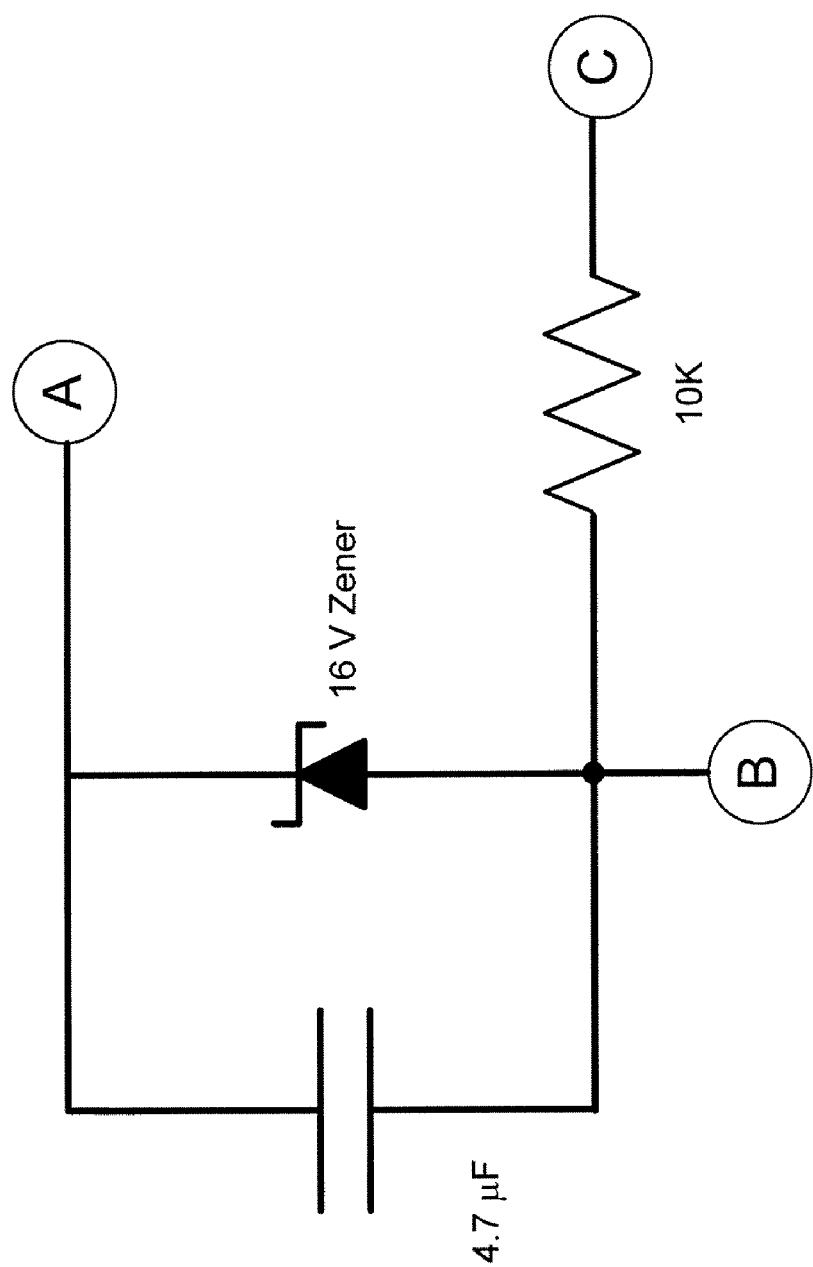
FIG. 3 shows details of a split supply circuit for supplying power to the differential multiplexor.

The differential multiplexer 120 receives a split supply voltage from the split supply circuit 122, the details of which are shown in FIG. 3. A split supply is used because doing so improves the accuracy of the multiplexer 120 as compared to operating with a single-ended supply. The split supply uses the voltage drop across a series string of eight cells 104 in the battery pack 102. A Zener diode with a Zener voltage that is approximately one half the voltage across the battery pack 102 fixes the voltage at terminal B at the midpoint between the voltage at terminal A and the voltage at terminal C. Thus, terminal A provides the positive voltage rail of the multiplexer 120, terminal C provides the negative rail of the multiplexer 120, and terminal B provides the ground reference of the multiplexer 120. The described exemplary embodiment has a battery pack of eight cells connected in series, each cell having a voltage of 4 volts, for a total pack voltage of 32 volts. A 16 volt Zener diode fixes the voltage between terminal A and terminal B at 16 volts and the voltage between terminal B and terminal C at 16 volts.

The select generating timer circuitry 124 (SGTC) provides select signals 136 to the multiplexer 120. The select signals 136 represent a repeating sequence of all possible input values to the select inputs 132, thereby cyclically directing each of the signal pairs 130 from the cells of the battery pack 102 to the output 134 of the multiplexer 120. In one embodiment, the SGTC 124 generates select signals by directing the output of a generic 555 timer device to a ripple carry adder having at least three bits. The SGTC 124 also provides the select signals 136 to the system controller 108 so that the system controller 108 will be synchronized with respect to which cell 104 is being monitored.

Figure 4:
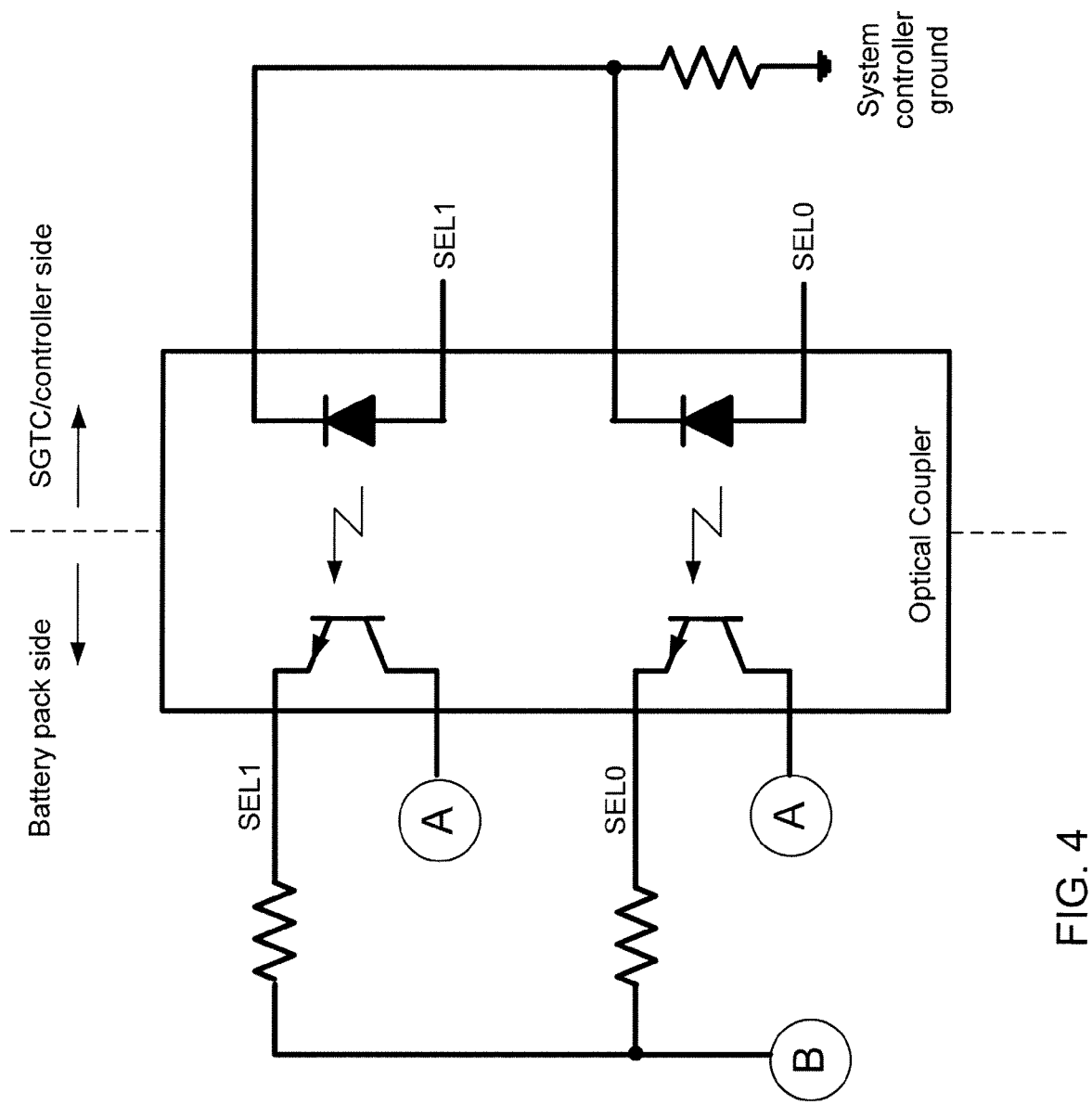
FIG. 4 shows details of how two of the select lines are isolated from the multiplexer.

In order to electrically isolate the incompatible (and potentially damaging) voltages of the battery pack 102 from the system controller 138, the SGTC 124 conditions the select signals 136 with optical isolators. FIG. 4 shows the details of how two of the select lines (SEL0 and SEL1) from the SGTC 124 are isolated from the multiplexer 120. Other techniques known in the art for providing electrical isolation may also be used.

Figure 5:
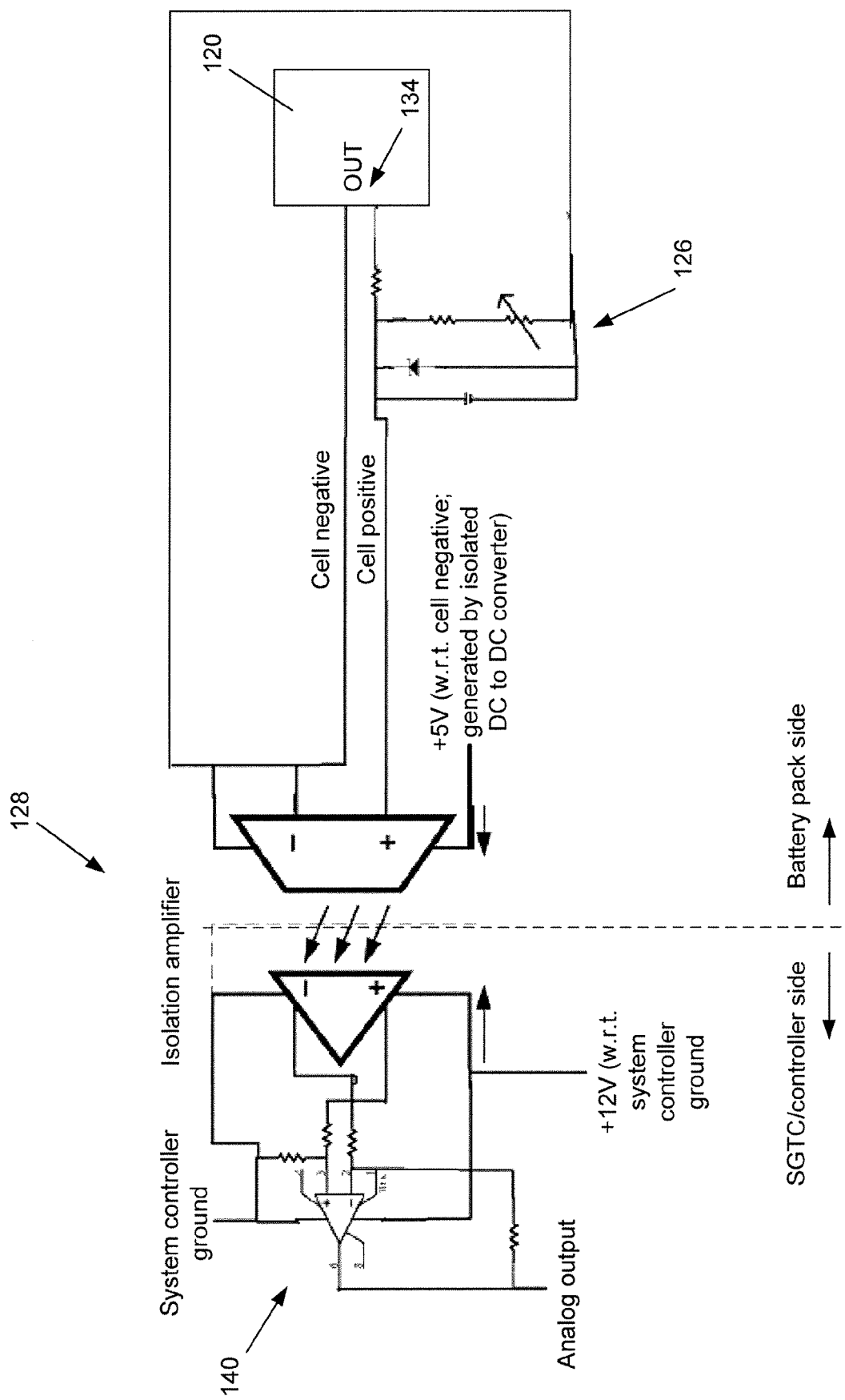
FIG. 5 shows an exemplary embodiment of the conditioning circuitry and the isolation amplifier.

The multiplexer 120 presents the selected cell voltage at the multiplexer output 134. The selected cell voltage passes through signal conditioning circuitry 126 prior to being presented to an isolation amplifier 128. The signal conditioning circuitry 126 consists of a voltage divider network that scales the cell voltage to be compatible with the input of the isolation amplifier 128. FIG. 5 shows an exemplary embodiment of the conditioning circuitry 126 and the isolation amplifier 128. The isolation amplifier 128 in this embodiment is of the type typically used for current sensing in electric motor drives. In the described embodiment, the isolation amplifier 128 is powered by two separate power supplies. The input side of the isolation amplifier is powered with a supply voltage referenced to the negative side of the selected cell voltage, and is generated with an isolated DC to DC converter. The output side of the isolation amplifier is powered with a supply voltage referenced to the system controller ground.

The current based isolation amplifier 128 of FIG. 5 provides a linearity, stability, and accuracy that would be lacking with a linear opto-coupler scheme typically used in prior art systems. The output of the isolation amplifier 128 is referenced to the same ground as the main system controller control unit 108. The output of the isolation amplifier 128 goes to an op-amp circuit 140 that performs impedance matching and provides a large gain to increase the amplitude of the cell voltage signal to a level suitable for the system controller 108. Each block of eight series-connected cells produces one proportional output voltage, sequentially corresponding to each cell in the battery pack. The output voltage is isolated from the battery pack 102, and can be safely read and processed by the control unit 108.

II. Cell Balancing

Figure 6:
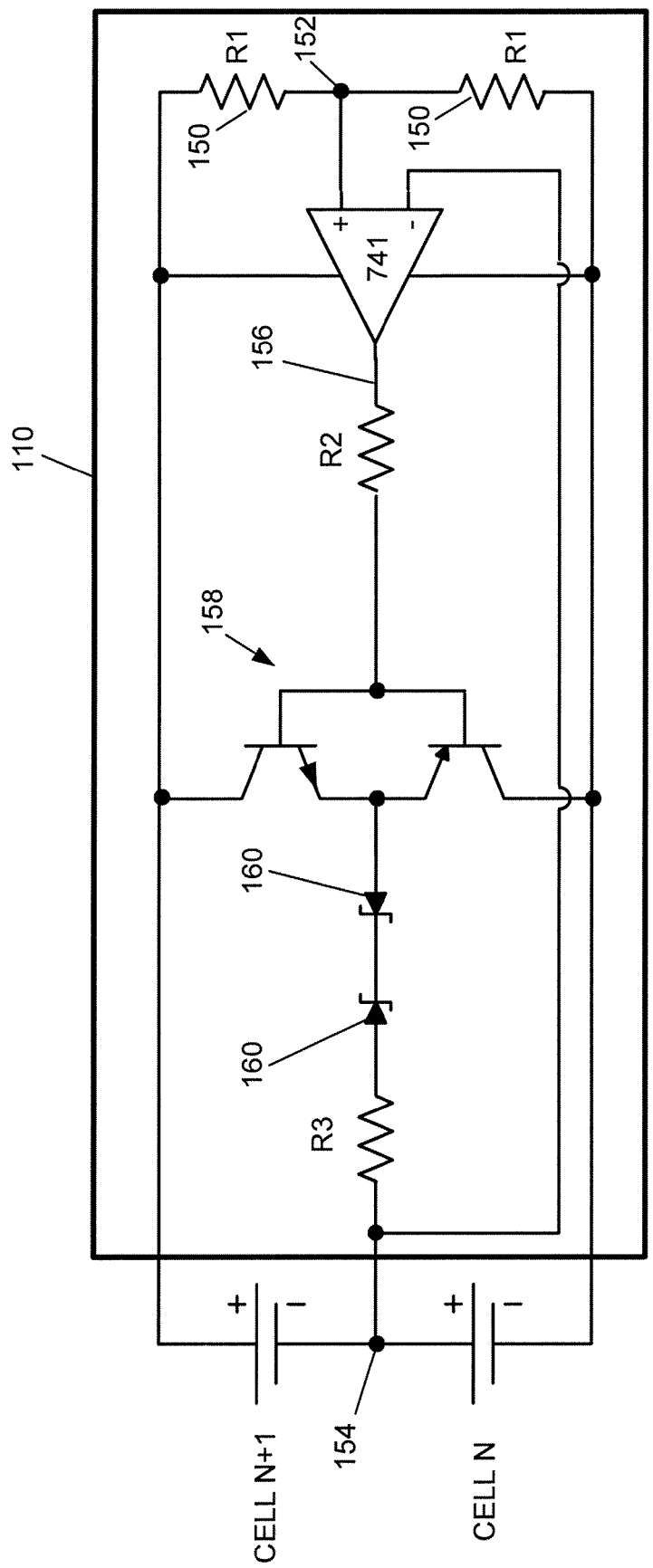
FIG. 6 shows details of a balancing circuit of the balancing module.

Cell balancing is accomplished using a comparator preceded by a back to back zener diode configuration. An exemplary embodiment of the full balancing scheme is shown in FIG. 6. In general, the balancing module 110 consists of several balancing circuits 111, each of which balances a pair of cells. One of the balancing circuits 111 is shown in FIG. 6.

In general, each balancing circuit within the balancing module 110 uses a pair of equal resistors 150 to form a "one half" voltage divider, which creates a voltage reference 152 that is one half of the total voltage across the cell pair N and N+1. A general purpose 741 operational amplifier compares the reference voltage 152 to the actual midpoint voltage 154 between the cell pair N and N+1, and uses the resulting error signal 156 generated to drive a stacked transistor pair 158. The error signal 156 is non-zero if the midpoint voltage 154 is not equal to the reference voltage 152. If the error signal 156 is non-zero, it drives one of the transistor pair into conduction. The active transistor adjusts the charge in one of the cell pair until the midpoint voltage equals one half of the total voltage across the cell pair, thereby reducing the error signal to zero and turning off the active transistor.

A problem with many conventional comparator based balancing systems arises when a cell becomes disconnected from the balancing circuit. A disconnected cell ordinarily leads to the discharging of the cell with which the disconnected cell is being balanced. This discharge in turn leads to the next cell in the series string discharging and so forth. So if a string of conventional balancers are connected to the pack a chain reaction occurs where all the cells upstream from the disconnected cell discharge to zero volts causing a dramatic under-voltage.

The cell balancing arrangement in the described embodiment addresses this problem by incorporating strategically selected Zener diodes 160, arranged in a back-to-back configuration, that only allow current to flow if both cells are connected. If either cell becomes disconnected, one of the Zener diodes 160 (depending on which cell is disconnected) blocks the flow of current from the cell that has not been disconnected.

The Zener voltage value of the Zener diodes 160 determine how low the cell that has not been disconnected can discharge in the case where the other cell has been disconnected. Therefore the particular Zener diodes selected for the balancing circuit depends on the particular type of cells used in the battery pack 102 (i.e., the minimum safe voltage for the particular cell technology). Thus, the Zener diodes maintain the charge stored in each cell 104 of the battery pack 102 from dropping below a predetermined threshold, that threshold being determined by the value of the Zener diode 160.

III. Temperature Monitoring

Temperature sensing is useful in particular when lithium cells are used to in the battery pack 102. Lithium cells can degrade when exposed to temperatures outside of their recommended temperature range, and excessive temperatures can produce an unstable or dangerous scenario. For this reason, the temperature of battery packs are often closely monitored to discontinue their use when temperature thresholds are passed.

Figure 7:
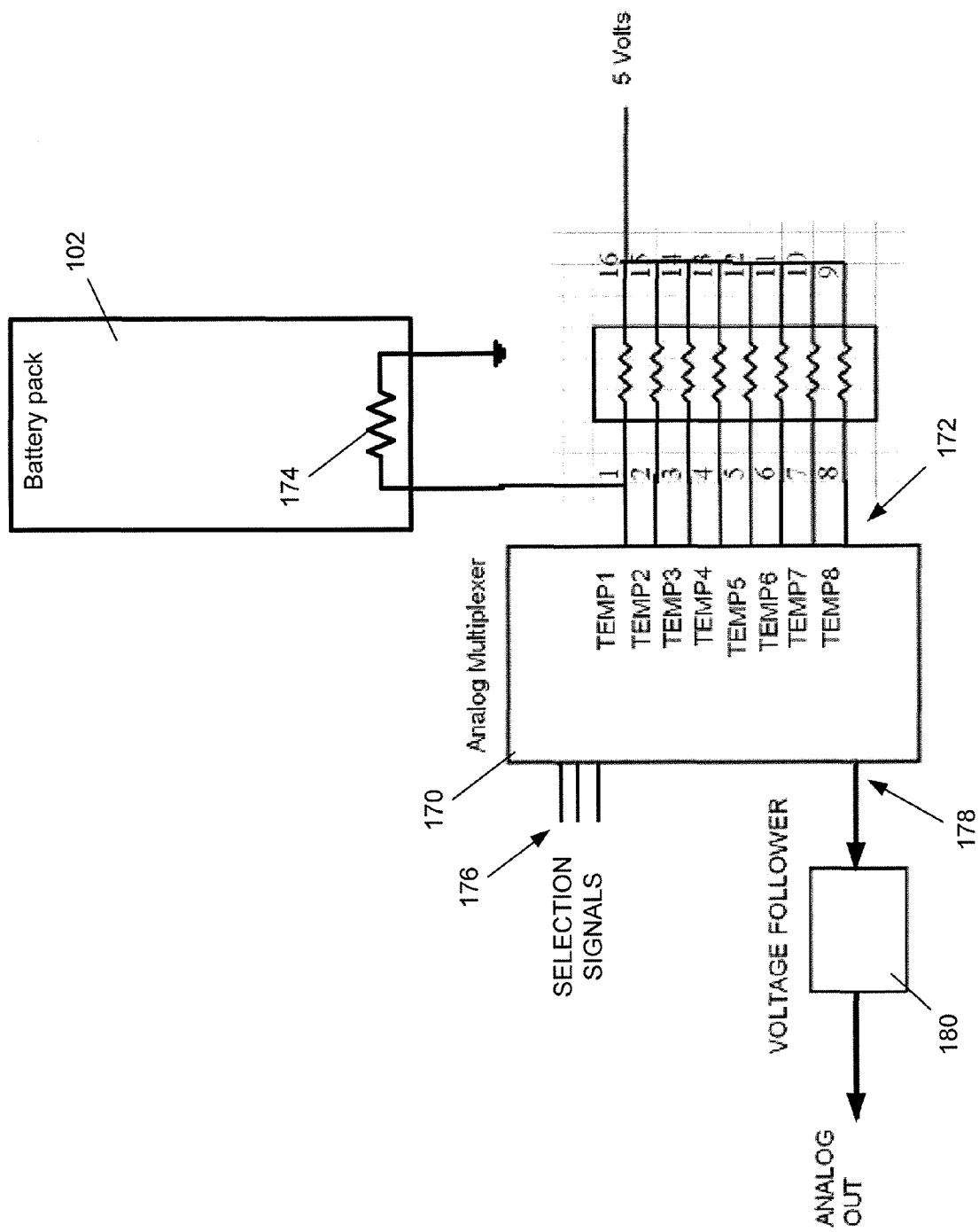
FIG. 7 shows a temperature sensing configuration for one embodiment of a battery monitoring and balancing system.

FIG. 7 shows a temperature sensing configuration for one embodiment of a battery balancing and monitoring system. This embodiment uses a thermister strategically mounted in the battery pack to convert of temperature the immediate environment of the thermister into an electrical signal, although other temperature-to-electric signal transducers known in the art may also be used.

FIG. 7 shows an analog multiplexer 170 for selecting one of several thermister inputs 172. For clarity, only thermister 174 associated with battery pack 102 is shown connected to the first input of multiplexer 170, although generally thermisters associated with other battery packs will also be connected to the other inputs of multiplexer 170.

The thermister 174 is combined at the multiplexer input 172 with a fixed pull up resistor, so that the input to the multiplexer 170 is the middle of a resistive voltage divider. Since the resistance of the thermister varies with the temperature of the thermister, the voltage at the input of the multiplexor also varies with the thermister temperature.

Selection signals 176 select a particular thermister input of the multiplexer 170 to be channeled to the multiplexer output 178. Generally the system controller will provide the selection inputs, but some embodiments may simply include circuitry that provides a repeating count to the multiplexer select inputs so that the system controller observes the temperature information from the connected battery packs in a predetermined sequence.

A voltage follower 180 receives the signal from the multiplexer output 178. The voltage follower 180 buffers the signal and provides the buffered signal to the system controller.

IV. System Integration

Figure 8:
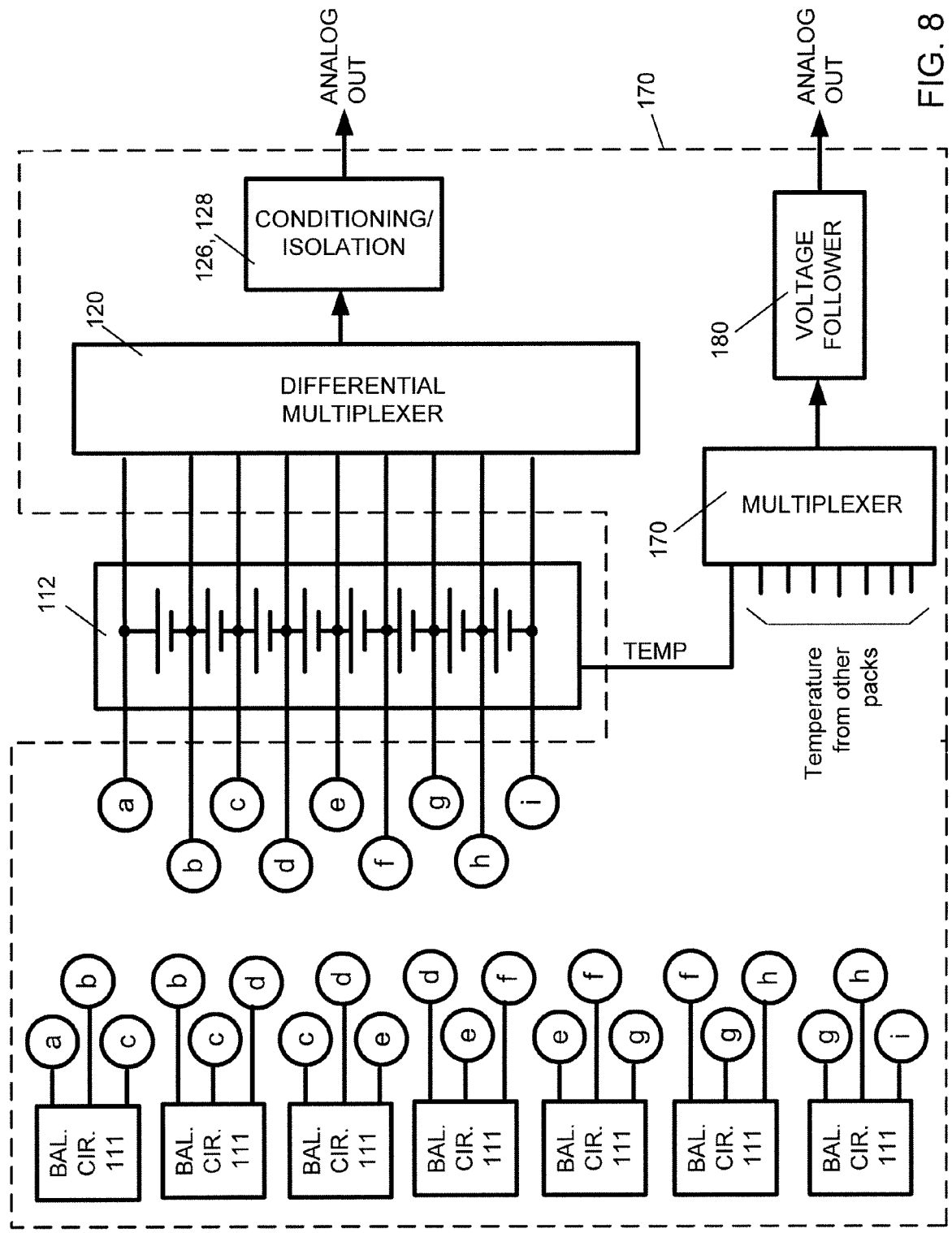
FIG. 8 shows an example of the functions and modules of the described embodiments integrated into a single system.

FIG. 8 shows an example of the functions and modules of the described embodiments integrated into a single system 190, residing for example on a printed circuit board, for interconnection with battery pack having eight series connected cells. As described herein, this is only an exemplary embodiment, and battery packs having more or less than eight cells may also be used.

Thus, it will be seen from the foregoing embodiments and examples that there has been described a way to monitor battery cells for voltage and temperature and to balance the cells during charging and discharging operations for performance, longevity and safety.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for balancing energy delivery devices within the one or more battery packs, comprising:
   at least one group of N energy delivery devices electrically connected in series, wherein N is an integer greater than one;
   for each group of N energy delivery devices, a balancing circuit for each adjacent pair of energy delivery devices, wherein the balancing circuit adjusts charge stored in each energy delivery device of the adjacent pair so that (i) the charge stored in a first energy delivery device of the pair is substantially equal to a second energy delivery device of the pair, and (ii) the charge stored in each energy delivery device remains above a predetermined threshold; and a pair of Zener diodes arranged in a back-to-back configuration included in the balancing circuit, wherein current flow is blocked from one of the energy delivery devices in the adjacent pair if the other energy delivery device in the adjacent pair becomes disconnected.

2. The system of claim 1, wherein the Zener diodes maintain the charge stored in each energy delivery device above the predetermined threshold.

3. The system of claim 1, wherein the balancing circuit maintains the charge stored in each energy delivery device.

4. The system of claim 1, further including a voltage monitoring module for sequentially selecting each of the energy delivery devices and providing a voltage associated with the selected energy delivery device at an output port, wherein the voltage monitoring module uses a low on-resistance differential multiplexer to select each of the energy delivery devices and provide the associated voltage.

5. The system of claim 4, wherein the differential multiplexer is powered by a split supply circuit.

6. The system of claim 4, wherein the voltage monitoring module provides isolation between the energy delivery devices and the output port.

7. The system of claim 6, wherein the isolation includes passing select signals for the multiplexer through optical isolators, and passing the voltage associated with the selected energy delivery device through an isolation amplifier.

8. The system of claim 1, further including a temperature monitoring module for receiving a signal representative of a temperature associated with the battery pack and one or more other battery packs, and for selectively providing one of the received signals at an output port.

9. The system of claim 4, wherein the balancing circuits and the voltage monitoring module are combined in a single printed circuit board.

10. The system of claim 1, wherein each energy delivery device is a lithium cell.

11. A system for providing isolated monitoring of one or more battery packs, and for balancing energy delivery devices within the one or more battery packs, comprising:

at least one group of N energy delivery devices electrically connected in series, wherein N is an integer greater than one;

for each group of N energy delivery devices, a balancing module and a voltage monitoring module;

wherein the balancing module includes a balancing circuit for each adjacent pair of energy delivery devices;

wherein the balancing circuit adjusts charge stored in each energy delivery device of the adjacent pair so that (i) the charge stored in a first energy delivery device of the pair is substantially equal to a second energy delivery device of the pair, and (ii) the charge stored in each energy delivery device remains above a predetermined threshold; and, wherein the voltage monitoring module includes:

(i) a differential multiplexer, operating on split supply, for sequentially selecting each of the energy delivery devices presented to a plurality of input ports and providing a voltage associated with the selected energy delivery device at an output port, wherein the differential multiplexer is characterized by a low on-resistance path from the input ports to the output port;

(ii) a resistor divider for scaling the voltage associated with the selected energy delivery device to produce a scaled voltage;

(iii) an isolation amplifier for providing an isolated version of the scaled voltage;

(iv) an isolated DC to DC converter for supplying power to an input side of the isolation amplifier, and (v) an output operational amplifier for impedance matching the scaled voltage to a system controller.

12. The system of claim 11, wherein the balancing circuit includes a pair of Zener diodes, arranged in a back-to-back configuration, for maintaining the charge stored in each energy delivery device.

13. The system of claim 12, further including (i) an operational amplifier for determining a level of charge imbalance between the adjacent pair of energy delivery devices and producing an error signal corresponding the level of charge imbalance, and (ii) a stacked transistor pair arranged to redistribute the charge of the adjacent pair of energy delivery devices according to the error signal.

14. The system of claim 11, wherein the differential multiplexer is powered by a split supply circuit.

15. The system of claim 11, further including a temperature monitoring module for receiving a signal representative of a temperature associated with the battery pack and one or more other battery modules, and for selectively providing one of the received signals at an output port.

16. The system of claim 11, wherein each energy delivery device is a lithium cell.

17. A method of balancing energy delivery devices within a battery pack, wherein the battery pack includes a group of N energy delivery devices electrically connected in series, N being an integer greater than one, comprising:

for each adjacent pair of energy delivery devices within the battery pack, adjusting charge stored in each energy delivery device of the adjacent pair so that the charge stored in the energy delivery devices of the pair is substantially equal, maintaining the charge stored in each energy delivery device above a predetermined threshold, and blocking current flow from one of the energy delivery devices in the adjacent pair if the other energy delivery device in the adjacent pair becomes disconnected.

18. The method of claim 17, further including redistributing charge between the adjacent pair of energy delivery devices with a redistribution circuit, wherein the redistribution circuit includes a pair of Zener diodes, arranged in a back-to-back configuration for maintaining the charge stored in each energy delivery device above a predetermined threshold.

19. The method of claim 17, further including sequentially selecting each of the energy delivery devices with a low on-resistance differential multiplexer, and providing a voltage associated with the selected energy delivery device.

20. The method of claim 17, further including supplying power to the differential multiplexer from a split supply circuit.

* * * * *